United States Patent Office 3,256,320
Patented June 14, 1966

3,256,320
DISUBSTITUTED CYCLOPENTENYL COMPOUNDS
Rostyslaw Dowbenko, Gibsonia, Pa., assignor to Pittsburgh Plate Glass Company, Pittsburgh, Pa., a corporation of Pennsylvania
No Drawing. Original application Aug. 16, 1960, Ser. No. 49,828. Divided and this application Mar. 17, 1965, Ser. No. 440,615
6 Claims. (Cl. 260—486)

This case is a division of application Serial No. 49,828, filed August 16, 1960, now abandoned.

This invention related to cyclopentenyl compounds containing a side chain of the formula R—O—CH₂—, wherein R is hydrocarbon or substituted hydrocarbon, and to methods of preparing the same. The invention has particular relationship to those cyclopentenyl compounds containing the foregoing group in the 5-position of the cyclopentene ring and a substituent for hydrogen in the 3-position of said ring.

This invention comprises the discovery that a conjugated cyclic diene; namely, cyclopentadiene of the formula

can be reacted by addition with halogenated ethers of the formula R—OCH₂X, wherein R is an aliphatic hydrocarbon or substituted aliphatic hydrocarbon group and X is a halogen, to effect introduction of the halogen into the ring accompanied by partial saturation of and shifting of the system of conjugated double bonds, the reaction being represented by the equation:

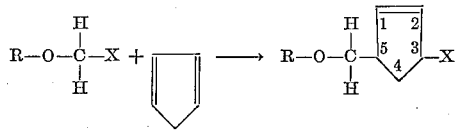

wherein R is an alkyl or alkenyl group containing up to 12 carbon atoms.

In the resultant compounds of the structure:

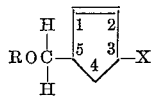

the halogen X and the olefinic bond are relatively labile and are susceptible of various reactions to provide a wide variety of useful compounds containing a five-member ring, many of which are novel chemical compounds. In order to conduct the reaction to form said 5-alkoxymethyl-3-halocyclopentenes, ethers containing a halomethyl group upon one side of the oxygen bridge and wherein R is represented by a wide variety of groups, including alkyl groups, such as methyl, ethyl, propyl, isopropyl, butyl, isobutyl, amyl, and alkenyl groups such as allyl, methallyl, crotyl and the like, can be employed. Group X preferably is chlorine, which is the most common halogen, but may also be bromine, iodine or fluorine. By reason of their lability, the halogens X in the 5-alkoxymethyl-3-halocyclopentenes may be easily removed, it being readily possible to replace them by various groups. The following are representative examples of such groups:

(A) Ester groups having the formula

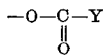

wherein Y is the organic moiety of various carboxylic acids, saturated and unsaturated, such moieties being represented by

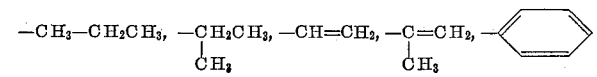

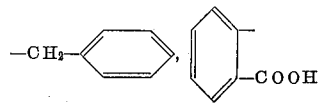

(as in phthalic acid), —CH₂CH₂—COOH (as in succinic acid), —CH=CH—COOH (as in maleic or fumaric acid),

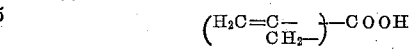

(as in itaconic acid);
(B) Hydroxyl groups (—OH);
(C) Ether groups, for example,

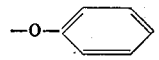

—O—CH₃, —O—CH₂CH₃, and others;
(D) Hydrocarbon groups, such as

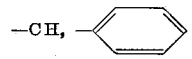

etc. When the moieties are of dicarboxylic acids, one or both carboxyls may be esterified.

The alkoxymethyl halogenated cyclopentenes and the derivatives thereof may be subject to various reactions, such as hydrolysis, hydrogenations, oxidations, saponifications, dehydrations and Grignard reactions, in various sequences in order to provide compounds useful per se, or to provide intermediates in the synthesis of many other compounds.

Thus, the 5-alkoxymethyl-3-halocyclopentenes may be subjected to hydrolysis to replace the 3-halogen by a hydroxyl —OH group. The latter product can also be obtained by saponification of the corresponding 5-alkoxymethyl-3-cyclopentene acetate.

Hydrogenation of the double bond in the cyclopentene ring before or after the compounds (5-alkoxymethyl-3-cyclopentenyl acetate or 5-alkoxymethyl-3-halocyclopentene) have been saponified, may be hydrogenated to provide alkoxymethylcyclopentanols of the formula:

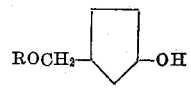

wherein R is of the significance previously indicated.
Oxidation of certain of these materials can also form ketones, as represented by the compound:

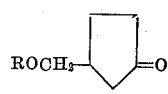

The benzylidene substituted derivatives thereof, as represented by 3-ethoxymethyl-2,5-dibenzylidenecyclopentanone of the formula:

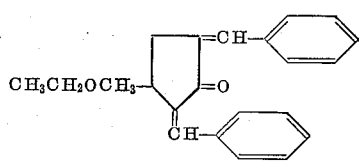

may be formed by reacting the above ketone with benzaldehyde.

Still other compounds comprise alkoxymethylcyclopentadiene, which is derived from 5-alkoxymethyl-3-chlorocyclopentene by dehydrochlorination. The dehydrochlorination products are conjugated cyclic dienes that can enter into various Diels-Alder reactions and polymerizations to give many useful derivatives wherein a hydrogen in a cyclopentenyl or cyclopentyl ring is replaced by alkoxymethyl groups, as well as other side chains.

The 5-alkoxy-3-halocyclopentenes may also be caused to undergo a Grignard reaction with an organo-magnesium halide, e.g., organo-magnesium bromide, to provide 5-alkoxy-3-organo-substituted cyclopentenes wherein Y in the formula:

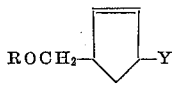

is methyl, phenyl, benzyl, or the like.

It will be recognized that cyclopentadienes in the foregoing reactions may often be replaced by substituted cyclopentadienes, such as methyl or ethyl-substituted cyclopentadiene, wherein 1, 2 or 3 ring hydrogens are replaced by methyl, ethyl or like substituents. The 5-alkoxymethyl-3-halocyclopentenes obtained by reacting a cyclopentadiene with hemiacetal halides may be represented by the formula:

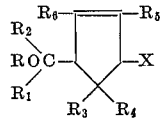

R, $R_1$, $R_2$ and X have the significance previously given, and $R_3$, $R_4$, $R_5$ and $R_6$ may be hydrogen or saturated hydrocarbon groups containing from 1 to about 4 carbon atoms and being represented, for example, by methyl, ethyl, propyl or other alkyl groups.

The compounds herein disclosed may be used for various purposes. Some of them may be used in the preparation of perfumes, drugs, insect repellants, etc. Those containing olefinic or conjugated diolefinic bonds may be polymerized as by addition reactions to give homopolymer resins which can be spread as protective and/or decorative films upon wood and metals. They may also be copolymerized under heat and pressure, or in the presence of Friedel-Crafts catalysts, with monomers such as styrene, or with glyceride drying oils such as linseed oil.

Some of the useful methods and products contemplated herein are illustrated by the following examples.

EXAMPLE I

This example is typical of the preparation of a 5-alkoxymethyl-3-chlorocyclopentene.

In the reaction, halomethyl ethers of the formula R—O—$CH_2$X (R and X having the significance previously described) are prepared by the usual methods. A convenient method is to react paraformaldehyde with an appropriate alcohol to supply the group R, in the presence of a hydrogen halide, e.g., hydrogen chloride.

In a typical example, 1 mole of methyl chloromethyl ether was dissolved in a solvent, e.g., 100 milliliters of ether. This solvent may also be replaced by a like volume of petroleum pentane, carbon tetrachloride, or other solvent or solvent mixture which is nonreactive. The reaction may be smoothly and efficiently catalyzed with a small amount of a catalyst, e.g., 2 milliliters of a solution containing 5 grams of a Friedel-Crafts catalyst, such as stannic chloride, in 100 milliliters of carbon tetrachloride or other solvent.

To the methyl chloromethyl ether solution were added 1.1 moles of cyclopentadiene in 100 milliliters of the solvent used for the chloromethyl ether component. Addition was slow (in the experimental batch, being over a period of about 1 hour and being dropwise) and the mixture was cooled to a temperature of about 0° C. to about 3° C. The reaction mixture, after all ingredients were in, was stirred at the same temperature for about 1.5 to 2.5 hours, after which 0.5 milliliter of triethylamine was added.

The solvent was evaporated at room temperature, but under vacuum to obtain the desired 5-methoxymethyl-3-chlorocyclopentene in a form suitable for use in many of the reactions herein disclosed.

The material was purified by distillation in the presence of a few pellets of potassium hydroxide. The distillate under a vacuum of 0.3 millimeter of mercury, boiled at a temperature in the range of 40° C. to 50° C. The pressures herein given in each instance are absolute. The refractive index ($n_D^{23}$) of the distillate was 1.4672.

The techniques of the foregoing reaction were repeated with the following chloromethyl ethers:

No.:
1 ------------------ Methyl chloromethyl ether.
2 ------------------ Ethyl chloromethyl ether.
3 ------------------ Isopropyl chloromethyl ether.
4 ------------------ Butyl chloromethyl ether.
5 ------------------ Allyl chloromethyl ether.

to provide the compounds of the following table:

Table A

No.: Name of compound
1 ------ 5-methoxymethyl-3-chlorocyclopentene.
2 ------ 5-ethoxymethyl-3-chlorocyclopentene.
3 ------ 5-isopropoxymethyl-3-chlorocyclopentene.
4 ------ 5-butoxymethyl-3-chlorocyclopentene.
5 ------ 5-allyloxymethyl-3-chlorocyclopentene.

The procedure as outlined in the foregoing example is typical. It will be evident that substantial variations in reaction conditions may often be used; thus, atmospheric, superatmospheric or subatmospheric pressures may be used in reacting the halomethyl ether with the cyclopentadiene. The temperatures of reaction also are susceptible of variation, for example, in a range between —30° C. and 25° C., or such other temperatures as will permit the desired reaction to proceed at a reasonable speed without undue volatilization of the reactants. The tin salt may be replaced by various Friedel-Craft type catalysts and if speed of reaction is not important, the catalyst may be omitted entirely from the reaction mixture.

Relative proportions of the halomethyl ether and cyclopentadiene may be varied. Naturally, the two materials actually react in equivalent amounts, and an approximation of such ratio is usually preferred; but for special purposes, halomethyl ether may be used in a ratio varying, for example, from about 0.25 to about 6 moles per mole of cyclopentadiene. The ingredient used in preponderant amount acts as a diluent and may be recovered by distillation or by solvent extraction or other methods at the end of the reaction.

EXAMPLE II

In this example, 5-alkoxymethyl-3-chlorocyclopentenes prepared by the method of Example I were reacted with sodium acetate in the presence of acetic acid to form esters of 5-alkoxymethyl-3-hydroxycyclopentene.

In a specific reaction, 4 moles of sodium acetate were dissolved in 1200 milliliters of acetic acid and the solution cooled to 60° C., and the crude 5-ethoxymethyl-3-chlorocyclopentene prepared from 2 moles of cyclopentadiene using the method of Example I, was slowly added.

The mixture was heated at 80° C. for 20 to 24 hours; the mixture was poured into water and was then extracted with ether; the extract was washed with aqueous sodium bicarbonate and the water was then removed. The solvent was evaporated under vacuum. The reaction product was primarily 5-ethoxymethyl-3-cyclopentenyl acetate.

This reaction was repeated using the various compounds of Table A as the alkoxymethyl-3-chlorocyclopentenes.

The properties of the several acetate products are as follows:

| No. (Table A) | Boiling Point Pressure | | Index of Refraction[1] | Formula | Analyses | | | |
| --- | --- | --- | --- | --- | --- | --- | --- | --- |
| | | | | | Theory | | Found[2] | |
| | °C. | Mm. Hg | | | C | H | C | H |
| 1 | 84 | 4.5 | 1.4519 | $C_9H_{14}O_3$ | 63.51 | 8.29 | 63.86 / 64.06 | 8.49 / 8.60 |
| 2 | 91 | 4.25 | 1.4491 | $C_{10}H_{16}O_3$ | 65.19 | 8.76 | 65.11 / 65.29 | 8.60 / 8.64 |
| 3 | 89 | 2.75 | 1.4463 | $C_{11}H_{18}O_3$ | 66.64 | 9.15 | 66.33 / 66.41 | 8.99 / 9.02 |
| 4 | 101 | 6.0 | 1.4493 | $C_{12}H_{20}O_3$ | 67.89 | 9.50 | 68.03 / 68.19 | 9.53 / 9.42 |
| 5 | 108–112 | 3.5 | 1.4601 | $C_{11}H_{16}O_3$ | 67.32 | 8.22 | 66.72 / 66.79 | 8.00 / 8.07 |

[1] Measured at 23° C., 23° C., 23° C., 24° C. and 30° C., respectively.
[2] The analyses were conducted in duplicate and the results are given separately for each sample.

EXAMPLE III

In this example, the conversion of a 5-alkoxy-methyl-3-chlorocyclopentene to the corresponding 5-alkoxy-methyl-3-hydroxycyclopentene is illustrated.

In the reaction, 320 grams (3 moles) of sodium carbonate were dissolved in 2 liters of water and 553 grams of crude 5-ethoxymethyl-3-chlorocyclopentene prepared from 3 moles of cyclopentadiene by the techniques of Example I, were added. The reaction was mildly exothermic and the temperature rose to 32° C. and remained so for 45 minutes. The mixture was then heated to about 75° C. for about 4.5 hours to insure completion of the reaction. A shorter or longer reaction time could be utilized and higher or lower temperatures could also be used. When it was evident that reaction was complete or substantially complete, the reaction mixture was cooled and extracted with ether.

Fractional distillation gave 223 grams (52 percent of theory) of liquid, boiling in a range of 72 to 85° C. at a pressure of 3 millimeters of mercury. The refractive index ($n_D^{23}$) was 1.4639. This product by infrared analysis gave a strong absorption band at 2.98 microns, indicating the presence of hydroxyls, and another at 9 microns, indicating the ether linkage.

The material was fractionally distilled and a fraction boiling at 90° C. under a pressure of 5 millimeters of mercury was considered to be essentially 5-ethoxymethyl-3-hydroxycyclopentene, which is of the theoretical formula

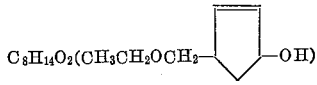

$C_8H_{14}O_2(CH_3CH_2OCH_2-\text{[cyclopentene]}-OH)$

Theoretical and experimentally determined analyses were as follows:

Theoretical analysis:
C _____ 67.55
H _____ 9.92
Experimental analysis:
  Sample 1—
    C _____ 67.70
    H _____ 9.61
  Sample 2—
    C _____ 67.83
    H _____ 9.76

A 34.5-gram fraction of impure 4-ethoxymethyl-2-cyclopentenyl ether, boiling at about 105° C. at a pressure of 0.2 millimeter of mercury and giving a refractive index ($n_D^{24}$) of 1.416 was also obtained. The formula of 4-ethoxymethyl-2-cyclopentenyl ether is:

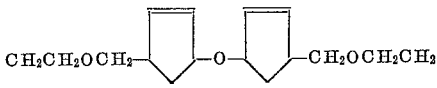

$CH_2CH_2OCH_2-\text{[cyclopentenyl]}-O-\text{[cyclopentenyl]}-CH_2OCH_2CH_3$

An 884-gram sample of crude 5-ethoxymethyl-3-chlorocyclopentene from reaction of 5 moles of cyclopentadiene by the techniques of Example I, were hydrolyzed with 690 grams (5 moles) of potassium carbonate in 2 liters of water, using the techniques substantially as described for sodium carbonate. Distillation gave a low-boiling forefraction which was primarily unreacted 5-ethoxymethyl-3-chlorocyclopentene, followed by 321 grams of a yellow liquid boiling between 71° C. at 5 millimeters of mercury and 90° C. at 3 millimeters of mercury, and a further 190-gram fraction of yellow liquid boiling between 87° C. at a pressure of 0.6 millimeter of mercury.

By fractional distillation, portions boiling in a range of 83° C. to 95° C. at 4 to 5 millimeters of mercury were obtained from the 321-gram fraction. The refractive indices ranged between 1.4632 and 1.4650.

The product contained 5-ethoxymethyl-3-hydroxycyclopentene. The other alkoxymethyl-3-halocyclopentenes may be converted to the 3-hydroxy compounds in similar manner.

EXAMPLE IV

In this example, 3-(ethoxymethyl)cyclopentanol of the formula:

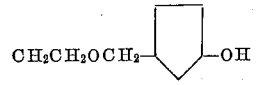

$CH_2CH_2OCH_2-\text{[cyclopentane]}-OH$ was obtained by the hydrogenation of 5-ethoxymethyl-3-hydroxycyclopentene prepared for 5-ethoxymethyl-3-chlorocyclopentene as described in Example III. The ethoxymethyl group could be replaced by other alkoxymethyl groups as herein disclosed.

In the hydrogenation reaction, 28.4 grams (0.20 mole) of 5-ethoxymethyl-3-hydroxycyclopentene, boiling in a range of 72° C. to 82° C. at 2.5 millimeters of mercury and having a refractive index ($n_D^{24}$) of 1.4639 was dissolved in 150 milliliters of methanol; 1 milliliter of Raney nickel was added as a hydrogenation catalyst and the mixture was placed in a hydrogenation apparatus. The theoretical amount of hydrogen was taken up in about 15 minutes.

A theoretical yield (28.8 grams) of a colorless oil boiling in a range of 83° C. to 93° C. at a pressure of 4.5 millimeters of mercury was distilled. The refractive index ($n_D^{25}$) was 1.4507. Infrared analysis gave a strong band at 2.97 microns, showing that the product was primarily an alcohol, 3-ethoxymethylcyclopentanol, having the empirical formula $C_8H_{16}O_2$. Two samples were analyzed and checked very well with the theoretical analysis.

ANALYSES

Theoretical:
- C _____ 66.63
- H _____ 11.19

Experimental:

Sample 1—
- C _____ 66.76
- H _____ 11.07

Sample 2—
- C _____ 66.95
- H _____ 11.03

EXAMPLE V

In this example, the acetate of a 3-alkoxymethyl-cyclopentenyl alcohol was obtained by hydrogenation of the corresponding acetate of 5-alkoxymethyl-3-hydroxycyclopentene.

In the reaction, 36.8 grams (0.2 mole) of the acetate of 5-ethoxymethyl-3-hydroxycyclopentene, boiling in a range of 89° C. to 92° C. at 4 millimeters of mercury, was dissolved in 150 milliliters of ethyl acetate and 1 milliliter of Raney nickel was added as a hydrogenation catalyst.

The mixture was shaken with hydrogen in a hydrogenation apparatus at a pressure of about 50 p.s.i. for about 2.5 hours, at which time the pressure drop was equivalent to an uptake of 103 percent of the theoretical amount of hydrogen. Filtration and distillation of the filtrate yielded 36 grams of colorless liquid boiling in a range of 76° C. to 78° C. under a pressure of 0.8 millimeter of mercury. A middle fraction boiling at 77° C. at 0.8 millimeter of mercury had a refractive index ($n_D^{22}$) of 1.4393. The formula was assumed to be $C_{10}H_{18}O_3$, which corresponds to 3-(ethoxymethyl)cyclopentyl acetate. Two samples were analyzed and the theoretical and experimental analyses are as follows:

ANALYSES

Theoretical:
- C _____ 64.49
- H _____ 9.74

Experimental:

Sample 1—
- C _____ 65.35
- H _____ 10.22

Sample 2—
- C _____ 65.58
- H _____ 10.10

The product was essentially 3-(ethoxymethyl)cyclopentyl acetate.

EXAMPLE VI

In this example, 3-(ethoxymethyl)cyclopentyl acetate is subjected to saponification with an alkali to provide 3-(ethoxymethyl)cyclopentyl alcohol.

In the reaction, a mixture of 27 grams (0.145 mole) of acetate of 3-(ethoxymethyl)cyclopentyl alcohol, boiling at 76° C. to 78° C. at a pressure of 0.8 millimeter of mercury, and 22 grams of potassium hydroxide were dissolved in a mixture of 150 milliliters of methanol and 20 milliliters of water. The mixture was refluxed for 4 hours and most of the solvent was distilled off under vacuum.

The residue was poured into water and was extracted with ether. The extract gave, upon distillation, 13 grams of a liquid which was redistilled to obtain 11 grams of a colorless liquid boiling in a range of 90° C. to 94° C. at a pressure of 6 millimeters of mercury.

The refractive index ($n_D^{23}$) was 1.4535. A strong infrared band, indicating a hydroxyl group, was obtained at 2.97 microns. There was no band indicating carbonyl groups. The formula $C_8H_{16}O_2$, corresponding to 3-(ethoxymethyl)cyclopentyl alcohol, was assumed and was closely confirmed by analysis of duplicate samples.

ANALYSES

Theoretical:
- C _____ 66.63
- H _____ 11.19

Experimental:

Sample 1—
- C _____ 66.84
- H _____ 11.01

Sample 2—
- C _____ 66.96
- H _____ 11.34

EXAMPLE VII

In this example, 3-(ethoxymethyl)cyclopentanone was prepared from 3-(ethoxymethyl)cyclopentyl alcohol by oxidation of the latter with chromic acid.

In the reaction, 3-(ethoxymethyl)cyclopentyl alcohol, boiling in a range of 88° C. at a pressure of 5.5 millimeters of mercury to 95° C. at 4.5 millimeters of mercury, was used as a starting material.

The charge comprised 10 grams (0.07 mole) of the alcohol dissolved in 30 milliliters of acetic acid.

To this solution was added dropwise over a period of 75 minutes, a solution of 5 grams (0.050 mole) of chromic acid dissolved in 5 milliliters of water and 15 milliliters of acetic acid. The temperature of the mixture remained in a range of 30° C. to 40° C. during the addition. After all the chromic acid solution was in, the mixture was further stirred for 1 hour at room temperature, and 3.5 hours at 40° C.

The reaction mixture was then diluted with water, neutralized with solid sodium bicarbonate, and extracted with ether. The extract was washed with aqueous sodium carbonate and dried.

Distillation of the product gave 7 grams of a colorless liquid boiling in a range of 90° C. to 97° C. at a pressure of 19 millimeters of mercury.

Examination by infrared spectrum showed a strong absorption band denoting the presence of the carbonyl group at 5.77 microns.

The material was redistilled to provide 4.5 grams of 3-(ethoxymethyl)cyclopentanone

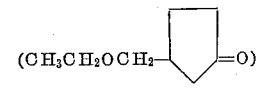

as a colorless liquid boiling in a range of 85° C. at a pressure of 7 millimeters of mercury, to 89° C. at 9 millimeters of mercury. The refractive index ($n_D^{23}$) was 1.4428. The theoretical composition was $C_8H_{14}O_2$. The theoretical analysis and the actual analyses as conducted upon two samples are compared as follows:

ANALYSES

Theoretical analysis:
- C _____ 67.57
- H _____ 9.92

Actual analyses:

Sample 1—
- C _____ 67.57
- H _____ 9.89

Sample 2—
- C _____ 67.78
- H _____ 10.01

The 2,4-dinitrophenylhydrazone of the 3-(ethoxymethyl)cyclopentanone melted at 81° C. to 82° C.

The theoretical analysis of the hydrazone based upon the formula $C_{14}H_{18}N_4O_5$, and the actual analysis of duplicate samples are compared as follows:

ANALYSES

Theoretical analysis:
C _____ 52.17
H _____ 5.63
N _____ 17.37

Actual analyses:
Sample 1—
C _____ 51.99
H _____ 5.32
N _____ 18.18
Sample 2—
C _____ 52.01
H _____ 5.10
N _____ 18.37

EXAMPLE VIII

In this example, 3-ethoxymethyl-2,5-dibenzylidenecyclopentanone was formed by reacting 3-(ethoxymethyl)cyclopentanone with benzaldehyde.

The reaction mixture comprised:

3-(ethoxymethyl)cyclopentanone _____grams__ 3.55
Benzaldehyde _____do____ 5.40
Methanol (diluent) _____milliliters__ 10.00

The solution was cooled and 0.3 gram of sodium methoxide was added as a catalyst. The temperature was then allowed slowly to rise to that of the room. After a few hours, the mixture crystallized to a yellow solid. More methanol was added and 6.5 grams of a greenish-yellow solid crystallized and was filtered off, leaving a greenish oil in the filtrate. The melting point of the solid was 101° C. to 104° C. After several further crystallizations from methanol, a yellow crystalline product having a melting point of 121° C. to 122° C. was separated. This was considered to be 3-ethoxymethyl-2,5-dibenzylidenecyclopentanone, having the structural formula:

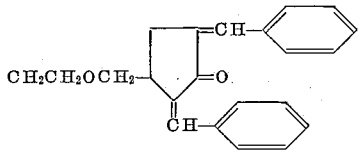

and being of the empirical formula $C_{22}H_{22}O_2$.

The theoretical analysis and the actual analyses in duplicate are compared as follows:

ANALYSES

Theoretical analysis:
C _____ 82.99
H _____ 6.97
Actual analyses:
Sample 1—
C _____ 82.87
H _____ 7.04
Sample 2—
C _____ 83.04
H _____ 6.84

EXAMPLE IX

In this example, the methacrylate ester of 5-ethoxymethyl-3-hydroxycyclopentene was formed by reacting 5-ethoxymethyl-3-chlorocyclopentene and sodium methacrylate. The reaction charge comprised:

5-ethoxymethyl-3-chlorocyclopentene _____grams__ 97
Sodium methacrylate _____do____ 54
Hydroquinone (polymerization inhibitor) __do____ 1
Dimethylformamide (solvent) _____milliliters__ 200

The mixture was heated at 100° C. for 20 hours and was then cooled, poured into water and extracted with ether. The extract was then washed with aqueous sodium bicarbonate and dried of water.

The solvent was evaporated and the residue was distilled to obtain 61 grams of yellow liquid boiling in a range of 45° C. to 117° C. at a pressure of 0.3 millimeter of mercury.

Fractional distillation produced 33 grams of a colorless liquid boiling in a range of 92° C. to 101° C. and mainly in a range of 98° C. to 100° C. at a pressure of 0.8 millimeter of mercury. The refractive index ($n_D^{25}$) was 1.4628. Infrared spectrum examination showed a band at 6.11 microns, indicating unsaturation. Comparison of the theoretical composition based upon the formula $C_{12}H_{18}O_3$ and the composition based upon actual analysis is as follows:

ANALYSES

Theoretical analysis:
C _____ 68.54
H _____ 8.63
Actual analysis:
Sample 1—
C _____ 68.48
H _____ 8.26
Sample 2—
C _____ 68.65
H _____ 8.55

The material contains a vinyl $>C=CH_2$ group in the 3-position; it may be used to form polymers and interpolymers. The ethoxymethyl group may be replaced by other alkoxymethyl groups as herein disclosed. For example, the alkoxy group may be propoxy, butoxy, allyloxy, or methallyloxy.

EXAMPLE X

In this example, 5-butoxymethyl-3-methoxycyclopentene was formed by reacting 5-butoxymethyl-3-chlorocyclopentene with methanol and potassium hydroxide.

The reaction mixture comprised 42 grams (0.75 mole) of potassium hydroxide in 750 milliliters of methanol, to which was added the crude 5-butoxymethyl-3-chlorocyclopentene from a 0.5 mole run of cyclopentadiene and butoxychloromethane. The temperature of the reaction mixture rose to 42° C. and the mixture was then refluxed for 5 hours.

The reaction mixture was poured into water and extracted with a mixture of ether and benzene. The extract solution was evaporated and distilled to obtain 72 grams of a yellow liquid boiling in a range of 55° C. at a pressure of 7 millimeters of mercury, to 140° C. at a pressure of 4 millimeters of mercury.

The yellow liquid was further fractionated to give 39 grams of a colorless liquid of a boiling point of 91° C. to 92° C. at a pressure of 5 millimeters of mercury. The product had the composition $C_{11}H_{20}O_2$, which is the empirical formula of 5-butoxymethyl-3-methoxycyclopentene. Duplicate samples of the material were subjected to analysis. These analyses are compared with the theoretical analysis of the compound as follows:

ANALYSES

Theoretical analysis:
C _____ 71.69
H _____ 10.94
Experimental analyses:
Sample 1—
C _____ 71.87
H _____ 10.99
Sample 2—
C _____ 71.91
H _____ 11.09

EXAMPLE XI

In this example, 5-ethoxymethyl-3-phenoxycyclopentene was prepared by the reaction of 5-ethoxymethyl-3-chlorocyclopentene and phenol in the presence of potassium carbonate.

The reaction charge comprised a mixture of 47 grams (0.50 mole) of phenol, 70.5 grams (0.51 mole) of potassium carbonate, and 300 milliliters of acetone. To a mixture was added dropwise over a period of 1 hour, a solution of 0.50 mole of the crude 5-ethoxymethyl-3-chlorocyclopentene dissolved in 100 milliliters of ether. The resultant mixture was refluxed at 50° C. for 22 hours, was cooled and poured into water, and was then extracted with ether. The extract was washed with dilute aqueous sodium hydroxide and volatile constituents were evaporated, leaving a yellow liquid. Fractionation of the liquid produced a forerun of unreacted chloride, followed by 33.5 grams of a colorless liquid having a boiling range of 118° C. to 132° C. at a pressure of 1.2 millimeters of mercury. The refractive index ($n_D^{24}$) was 1.5201. The product had the empirical formula $C_{14}H_{18}O_2$, which corresponds to the composition of 5-ethoxymethyl-3-phenoxycyclopentene. Duplicate samples of this material were subjected to quantitative carbon-hydrogen analysis and the values obtained are compared with the theoretical value as follows:

ANALYSES

Theoretical analysis:
C _____ 77.03
H _____ 8.31
Experimental analyses:
Sample 1—
C _____ 77.03
H _____ 8.16
Sample 2—
C _____ 77.23
H _____ 8.38

EXAMPLE XII

In this example, ethoxymethylcyclopentane was formed by the hydrogenation of 5-ethoxymethyl-3-chlorocyclopentene.

In the reaction, 48.3 grams (0.30 mole) of 5-ethoxymethyl-3-chlorocyclopentene having a boiling range of 43° C. under a pressure of 0.02 millimeter of mercury, to 54° C. under a pressure of 0.08 millimeter of mercury and of a refractive index (24° C.) of 1.4667, was used as a primary material. To this material were added 35 grams (0.36 mole) of triethylamine, 100 milliliters of ethyl acetate and 7 milliliters of Raney nickel catalyst. The mixture was shaken in a hydrogenation apparatus with hydrogen for 5.5 hours, at the conclusion of which time, 0.58 mole of hydrogen had been taken up.

The reaction mixture was poured into water and extracted with ether, and the extract phase was successively washed with acetic acid and aqueous sodium bicarbonate, and was then dried. The product was twice fractionally distilled to obtain a forefraction and 15.9 grams (41.5 percent of theory) of a colorless liquid which apparently was ethoxymethylcyclopentane. This liquid was distilled and a middle fraction of a boiling point of 145° C. to 146° C. was retained for analysis. The refractive index was 1.4256. The material had an empirical formula of $C_8H_{16}O$. Upon the basis of this formulation, the theoretical and the experimentally determined analyses are compared as follows:

ANALYSES

Theoretical analysis:
C _____ 74.94
H _____ 12.58
Experimental analyses:
Sample 1—
C _____ 74.85
H _____ 13.04
Sample 2—
C _____ 75.02
H _____ 12.85

EXAMPLE XIII

In this example, 5-ethoxymethyl-3-chlorocyclopentene was dehydrochlorinated by means of an organic base to form ethoxymethylcyclopentadiene and a polymer thereof. The starting 5-ethoxymethyl-3-chlorocyclopentene was that produced by reacting 1.5 gram moles of cyclopentadiene with hemiacetal chloride by the method of Example I. This material, mixed with 300 milliliters of triethylamine, was refluxed at 82° C. for 23 hours. The excess amine was distilled off and the residue was dissolved in petroleum pentane, cooled and the triethylene hydrochloride formed by the reaction was filtered off as a white solid.

The filtrate was thoroughly washed first with dilute acetic acid and then with aqueous sodium bicarbonate, and was then dired. The solvent was evaporated off to give 93.6 grams of a residue which was distilled, leaving 84 grams of a yellowish liquid boiling in a range between 54° C. at a pressure of 17 millimeters of mercury, and 165° C. at 0.7 millimeter of mercury.

Distillation gave lower boiling fractions, e.g., a fraction boiling in a range between 44° C. at a pressure of 4.5 millimeters of mercury, and 48° C. at a pressure of 0.3 millimeter of mercury, and a main fraction of yellowish liquid boiling in a range between 93° C. at a pressure of 1.1 millimeters of mercury, and 120° C. at a pressure of 1.5 millimeters of mercury.

From this liquid was fractionated 35 grams of a colorless liquid boiling in a range of 100° C. to 135° C. at a pressure of 1.5 millimeters of mercury, and having a refractive index ($n_D^{22}$) of 1.4928.

The lower boiling fractions reacted with maleic anhydride, forming a white solid melting in a range of 122° C. to 126° C. This fraction was rich in the conjugated diene ethoxymethylcyclopentadiene of the formula:

[structure: cyclopentadiene ring with $-CH_2OCH_2CH_3$ substituent]

This conjugated diene may be reacted with other monomers and by addition or by Diels-Alder reaction. The compound in pure or mixed state may be reacted with linseed oil or other oils containing two or more double bond to give a drying oil capable of drying to form coatings. It may thus replace cyclopentadiene in the process of modifying drying oils, as disclosed in Patent No. 2,689,232 to H. L. Gerhart.

The fraction boiling in the range of 100° C. to 135° C. as above described, apparently is a dimer with the ring structure of dicyclopentadiene:

[structure: dicyclopentadiene-type ring with $CH_2$ and $(CH_2OR)_n$ substituents]

wherein R is hydrocarbon, e.g., methyl, ethyl, propyl, allyl, phenyl or benzyl, and $n$ is a number from 1 to 2.

This dimer, when spread as a paint or varnish film, will air dry at atmospheric pressure in 24 hours and can be baked to hard, adherent state in 1 hour at 100° C.

The material develops very strong bands in the infrared spectrum at 2.9 microns and 5.85 microns.

In a further extension of the techniques of this example, triethylamine was replaced as a dehydrochlorinating agent by trimethylpyridine. The temperature selected for reaction was 50° C. The reaction was then completed in 8 hours.

Purification resulted in a colorless liquid boiling in a range of 95° C. to 115° C. at a pressure of 0.2 millimeter of mercury, with a refractive index ($n_D^{23}$) of 1.4928, which matched that of the material in the preparation of which the dehydrochlorination base was triethylamine.

The infrared spectra of the two materials also matched. The last material apparently was also a dimer.

A 12.5-gram sample of this dimer, after absorption of 0.061 mole of hydrogen, gave 10 grams of a material which was a colorless liquid boiling in a range between 75° C. at a pressure of 0.02 millimeter of mercury and 110° C. at a pressure of 0.05 millimeter of mercury. The refractive index ($n_D^{24}$) was 1.4842. The infrared spectrum of this material departed substantially from that of the material before hydrogenation.

EXAMPLE XIV

In accordance with this example, the halogen, such as chlorine, in t-alkoxymethyl-3-halomethylcyclopentene is reacted with a Grignard reagent to replace said halogen with a hydrocarbon group. Five-tenths (0.5) gram mole of methyl magnesium iodide was dissolved in 300 milliliters of ether, and there was added drop by drop over a period of 1.5 hours, a cold solution of 0.5 mole of the crude 5-ethoxymethyl-3-chloromethylcyclopentene dissolved in ether to provide a 175-milliliter solution. The resultant reaction was highly exothermic.

The mixture was refluxed for 45 minutes, during which time an intense green coloration developed and a green oil precipitated. The reaction mixture was allowed to stand for 0.5 hour and a saturated, aqueous ammonium chloride solution was added to split off magnesium iodide chloride in well-known manner, and leave 5-ethoxymethyl-3-methylcyclopentene.

The solvent was evaporated and the residue was fractionally distilled to obtain 25 grams of a dark orange liquid boiling in a range of 44° C. at a pressure reduced to 11 millimeters of mercury, to 45° C. under a pressure of 10 millimeters of mercury. The liquid was washed with a reducing agent; namely, aqueous sodium sulfite, and was redistilled to obtain 23 grams of a nearly colorless liquid boiling at 68° C. to 69° C. at a pressure of 34 millimeters of mercury, and having a refractive index ($n_D^{23}$) of 1.4357. The liquid decolorized bromine in carbon tetrachloride and exhibited an infrared spectrum free of bands showing the presence of hydroxyl and carbonyl groups.

Duplicate carbon-hydrogen analyses gave values corresponding to the empirical formula $C_9H_{16}O$. The values obtained are as follows:

ANALYSES
Theoretical analysis:
C ---------------------------------------- 77.03
H ---------------------------------------- 8.31
Experimental analysis:
  Sample 1—
    C ---------------------------------------- 77.03
    H ---------------------------------------- 8.16
  Sample 2—
    C ---------------------------------------- 77.23
    H ---------------------------------------- 8.28

The product was essentially pure 5-ethoxymethyl-3-methylcyclopentene of the formula:

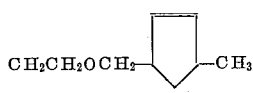

EXAMPLE XV 5-ethoxymethyl-3-chlorocyclopentene was reacted with a Grignard reagent; namely, phenylmagnesium bromide. In the reaction, 0.54 mole of 5-ethoxymethyl-3-chlorocyclopentene dissolved in 100 milliliters of benzene was stirred into 1.0 gram mole of phenylmagnesium bromide over a period of 1.5 hours.

The reaction was exothermic and a solid precipitated at the end of the reaction. The mixture was refluxed for 16 hours and was then cooled. Magnesium bromide-chloride was split off by the addition of an excess of saturated aqueous ammonium chloride to provide 5-ethoxymethyl-3-phenyl-cyclopentene.

The product was extracted with petroleum pentane, the solution from which was distilled to give 106 grams (96 percent of theory) of a yellowish liquid boiling in a range of 35° C. at a pressure of 0.2 millimeter of mercury to 105° C. at a pressure of 0.03 millimeter of mercury. This material was twice fractionated to obtain 82.8 grams (76 percent of theory) of a colorless liquid boiling in a range of 87° C. to 99° C. at a pressure of 0.1 millimeter of mercury. The middle portion boiling in the range of 95° C. to 96° C. at a pressure of 0.1 millimeter of mercury and having a refractive index ($n_D^{24}$) of 1.5219 was subjected in duplicate to carbon-hydrogen analyses. The results and the corresponding theoretical values, based upon the empirical formula $C_{12}H_{18}O$ for 5-ethoxymethyl-3-phenylcyclopentene, are tabulated as follows:

ANALYSES
Theoretical analysis:
C ---------------------------------------- 83.12
H ---------------------------------------- 8.97
Experimental analysis:
  Sample 1—
    C ---------------------------------------- 84.23
    H ---------------------------------------- 8.44
  Sample 2—
    C ---------------------------------------- 84.55
    H ---------------------------------------- 8.62

I claim:
1. A compound of the formula:

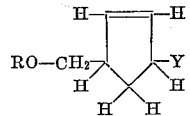

where R is selected from the group consisting of lower alkyl and lower alkenyl radicals, Y being selected from the group consisting of —OCOCH₃, —OH and $$OCOC(CH_3)=CH_2$$

when R is lower alkyl and the group —OCOCH₃, —OH, —OCO(CH₃)=CH₂, —O phenyl, —CH₃, -phenyl, and OCH₃ when R is lower alkenyl.

2. The compound of claim 1 where R the lower alkenyl group is selected from the group consisting of allyl and methallyl.

3. A compound as in claim 1 where R is lower alkyl and Y is —OH.

4. A compound as in claim 1 where R is lower alkenyl and Y is —OH.

5. A compound as in claim 1 wherein R is lower alkyl and Y is —OCOC(CH₃)=CH₂.

6. A compound as in claim 1 where R is lower alkenyl and Y is —OCOC(CH₃)=CH₂.

References Cited by the Examiner
UNITED STATES PATENTS
2,898,378   8/1959   Young ------------- 260—611

OTHER REFERENCES
Nazarov et al.: Chem. Abstracts, vol. 54 (1960), p. 1348 from Zhur Obshchei Khim, vol. 29 (1959), pp. 767–75.
Straus et al.: Justus Liebigs Annaldender Chemie, vol. 525 (1936), pp. 151–182.

LORRAINE A. WEINBERGER, Primary Examiner.

A. P. HALLUN, Assistant Examiner.